United States Patent
Keutz et al.

(10) Patent No.: US 7,040,648 B2
(45) Date of Patent: May 9, 2006

(54) ASSEMBLY OF A GAS GENERATOR AND A GENERATOR HOLDER

(75) Inventors: Markus Keutz, Rossdorf (DE); Matthias Helmstetter, Aschaffenburg (DE)

(73) Assignee: TRW Automotive Safety System GmbH, Aschaffenburg (DE)

( * ) Notice: Subject to any disclaimer, the term of this patent is extended or adjusted under 35 U.S.C. 154(b) by 286 days.

(21) Appl. No.: 10/655,779

(22) Filed: Sep. 5, 2003

(65) Prior Publication Data
US 2004/0061314 A1    Apr. 1, 2004

(30) Foreign Application Priority Data
Sep. 27, 2002    (DE) .................. 202 14 954

(51) Int. Cl.
*B60R 21/16*    (2006.01)

(52) U.S. Cl. ................................. 280/728.2
(58) Field of Classification Search ............ 280/728.2, 280/731, 732, 741

See application file for complete search history.

(56) References Cited

U.S. PATENT DOCUMENTS

| 5,141,247 | A | | 8/1992 | Barth |
| 5,275,431 | A | * | 1/1994 | Stephens ................. 280/728.2 |
| 5,320,379 | A | * | 6/1994 | Burnard et al. .......... 280/728.2 |
| 5,388,858 | A | * | 2/1995 | Cuevas .................... 280/728.2 |
| 5,409,256 | A | | 4/1995 | Gordon et al. |
| 5,547,213 | A | | 8/1996 | Lang et al. |
| 5,615,907 | A | | 4/1997 | Stanger |
| 6,431,582 | B1 | | 8/2002 | Ennis et al. |

* cited by examiner

*Primary Examiner*—David R. Dunn
(74) *Attorney, Agent, or Firm*—Tarolli, Sundheim, Covell & Tummino L.L.P.

(57) ABSTRACT

An assembly comprises a gas generator with a flange and a generator holder, on which the flange is fastened. The generator holder has a cylindrical peripheral wall, the peripheral wall at least partially surrounding the gas generator peripherally. At least one clamping extension is provided in the peripheral wall, which is formed by partial lateral deformation of the peripheral wall. The clamping extension is delimited by at least one slit in the peripheral wall. The slit runs substantially in peripheral direction and defines a side of the clamping extension, the side of the clamping extension constituting a stop for the flange.

8 Claims, 1 Drawing Sheet

ASSEMBLY OF A GAS GENERATOR AND A GENERATOR HOLDER

FIELD OF THE INVENTION

The invention relates to an assembly of a gas generator with a flange and a generator holder on which the flange is fastened.

BACKGROUND OF THE INVENTION

The fastening of the gas generator to a generator holder or to a gas bag module must, on the one hand, be able to reliably withstand high forces, but on the other hand should also be simple to produce, in order to keep labour time and costs low. The fewer the number of individual components, the more simply can these aims be achieved.

BRIEF SUMMARY OF THE INVENTION

One object of the invention is to provide a quick and reliable fastening of a gas generator.

This is achieved by an assembly comprising a gas generator with a flange and a generator holder, on which the flange is fastened. The generator holder has a cylindrical peripheral wall, the peripheral wall at least partially surrounding the gas generator in a peripheral direction. At least one clamping extension is provided in the peripheral wall, which is formed by partial lateral deformation of the peripheral wall. The clamping extension is delimited by at least one slit in the peripheral wall. The slit runs substantially in peripheral direction and defines a side of the clamping extension, the side of the clamping extension constituting a stop for the flange.

The clamping extension forms a kind of indentation of the peripheral wall. As the longitudinal side of the clamping extension is arranged substantially in peripheral direction, a stressing of the clamping extension takes place by an action of force in the direction of a central axis of the assembly, i.e. perpendicular to the plane defined by the peripheral direction, therefore not in the deformation direction of the clamping extension, but perpendicular thereto. Therefore, the clamping extension can receive a very high force without bending. Also, the clamping extension is relatively insensitive to bending by vehicle vibrations occurring during the lifespan of the gas generator.

Preferably, several clamping extensions are provided and, preferably, each clamping extension is delimited by two slits running substantially parallel to each other, extending in peripheral direction. This arrangement makes the manufacture of the clamping extensions very simple. The corresponding slits merely have to be formed in the wall sections of the generator holder and the clamping extensions need to be bent radially inwards, i.e. in the direction of the central axis of the generator holder or of the gas generator inserted therein.

The extent of the clamping extensions is determined by the spacing of the parallel slits in axial direction and through this their bending resistance parallel to the central axis of the generator holder. The clamping extensions are formed from the material of the wall sections themselves. The clamping extensions are not stressed in radial direction after the insertion of the gas generator into the generator holder.

The number of clamping extensions can be chosen according to the requirement and design of the gas bag module. Preferably, however, at least three clamping extensions are provided.

The peripheral wall of the generator holder preferably forms a peripherally closed cylindrical ring and is composed in peripheral direction of alternating first wall sections with clamping extensions and second wall sections without clamping extensions. With this construction, the clamping extensions preferably form strip-shaped sections of the peripheral wall, the opposite narrow sides of which continue in one piece into the second wall sections.

In this case the sections of the peripheral wall which form the strip-shaped sections are indented radially inwards, but not twisted with respect to the central axis of the generator holder. As the strip-shaped sections extend parallel to the central axis of the generator holder, they have a high bending resistance in this direction.

The peripheral wall formed from the wall sections surrounds the inserted gas generator. Depending on the construction of the assembly, the peripheral wall can be of circular cylindrical shape or may have another suitable shape.

In order to give the generator holder a high stability, the first wall sections preferably have bridges which are separate from the clamping extensions, each bridge connecting two second wall sections lying adjacent to each other, so that the upper edge of the peripheral wall forms a closed ring. The bridges are produced automatically, when the clamping extensions are formed by two parallel slits lying one over another, arranged in peripheral direction.

In a preferred embodiment of the invention, the generator holder has a radial flange, on which the flange of the gas generator rests in the installed state of the assembly. This radial flange can be further reinforced by a stiffening bead. Such a design allows for a high take-up of force by the generator holder. This embodiment is particularly advantageous when the flange completely surrounds the gas generator peripherally, the flange of the gas generator preferably resting with its entire surface in peripheral direction continuously on the flange of the generator holder. Thus, in addition, a sealing of the generator with respect to the generator holder can be achieved in a simple manner.

DETAILED DESCRIPTION OF PREFERRED EMBODIMENTS

Figure 1:
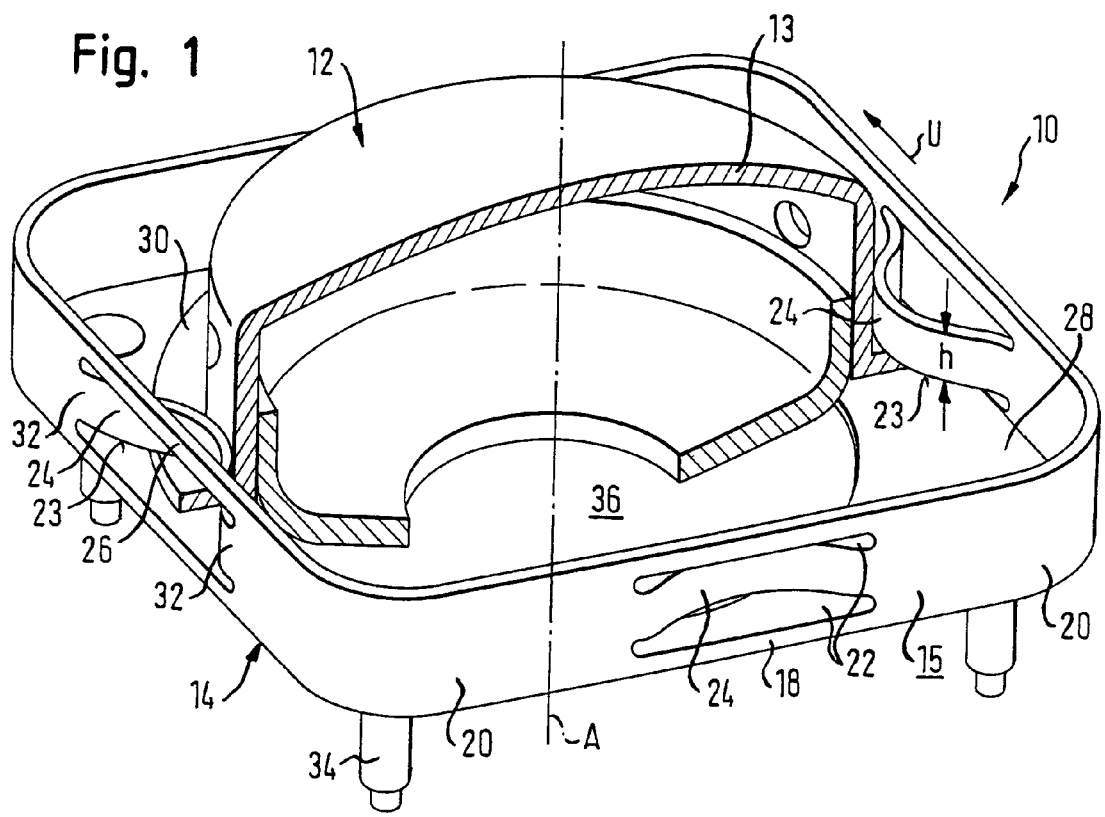
FIG. 1 shows a diagrammatic perspective view of an assembly in accordance with the invention according to a first embodiment.

In FIG. 1 an assembly 10 of a gas generator 12 and a generator holder 14 is illustrated. The gas generator 12 has a substantially cylindrical housing 13 with a radial flange 30 and is inserted into the generator holder 14 so that the central axes A of the two components coincide.

The generator holder 14 has a cylindrical peripheral wall 15, closed peripherally, which encloses a square area and surrounds the generator holder 14 on the edge. The peripheral wall 15 is composed of first and second wall sections 18, 20. The first and second wall sections 18, 20 are arranged alternately in peripheral direction U, i.e. along the peripheral wall 15. In each of the first wall sections 18 two slits 22 are provided, arranged one above the other and running parallel to each other in peripheral direction U. The slits 22 delimit the longitudinal sides of clamping extensions 24 which are deformable laterally inwards in the direction of the central axis A. The clamping extensions 24 are formed from strip-shaped sections of the peripheral wall 15 which is, as stated above, a cylindrical portion, the middle axis thereof being the central axis A of the gas generator 12. The side 23 of each clamping extension 24 defined by the lower of the two slits 22 constitutes a stop for the flange 30 which is connected with the gas generator.

The two narrow sides 32 of each clamping extension 24 continue in one piece into second wall sections 20. The clamping extensions 24 have an extent h in axial direction A of the generator holder, i.e. perpendicular to their deformation direction, which extent h is determined by the spacing of the slits 22 delimiting the clamping extensions. The wall regions forming the strip-shaped clamping extensions 24 are bent radially inwards, without changing their alignment in axial direction A, so that the clamping extensions 24 extend parallel to the central axis A. This construction of the clamping extensions 24 leads to a very high stability in axial direction A.

In the example shown here, four first wall sections 18 are provided with clamping extensions 24 and four second wall sections 20 without clamping extensions. Of course, the use of a different number and a different form of clamping extensions is also conceivable.

In axial direction A above the clamping extensions 24, the second wall sections 20 are connected with each other by means of bridges 26, so that the upper edge of the peripheral wall 15 forms a closed ring.

The generator holder 14 has a ring-shaped flange 28, which is delimited to the exterior by the peripheral wall 15 and extends at 90° to central axis A. The ring-shaped flange 30, which completely surrounds the gas generator 12 radially, can rest on the flange 28 with its entire surface and continuously along the periphery.

The assembly is very simple to install, by the gas generator 12 being inserted into the generator holder 14 so that the radial flanges 28, 30 rest one on the other and subsequently the clamping extensions 24 are deformed radially in the direction of the central axis A, so that the stops formed by the sides 23 of the clamping extensions engage the flange 30 and fix the gas generator 12 on the generator holder 14. Through the fastening of the gas generator 12 by means of the laterally deformed clamping extensions 24, a rattling of the gas generator 12 in the generator holder 14 can be largely avoided.

The gas generator 12 can be removed from the generator holder 14 in a simple manner by bending back the clamping extensions 24.

By resting the flanges 28, 30 one on the other already a certain gas-tightness is provided, but optionally an additional seal (not shown) can be included between the radial flanges 28, 30.

In the example shown here, the generator holder 14 constitutes also a gas bag holding element, so that the generator holder 14 together with the gas generator 12 fastened thereon can be inserted into a gas bag (not shown). On the generator holder, bolts 34 are arranged extending in axial direction A, which at the same time serve to fasten the gas bag to the generator holder 14 and to fasten the generator holder 14 to a module housing or to a vehicle.

Figure 2:
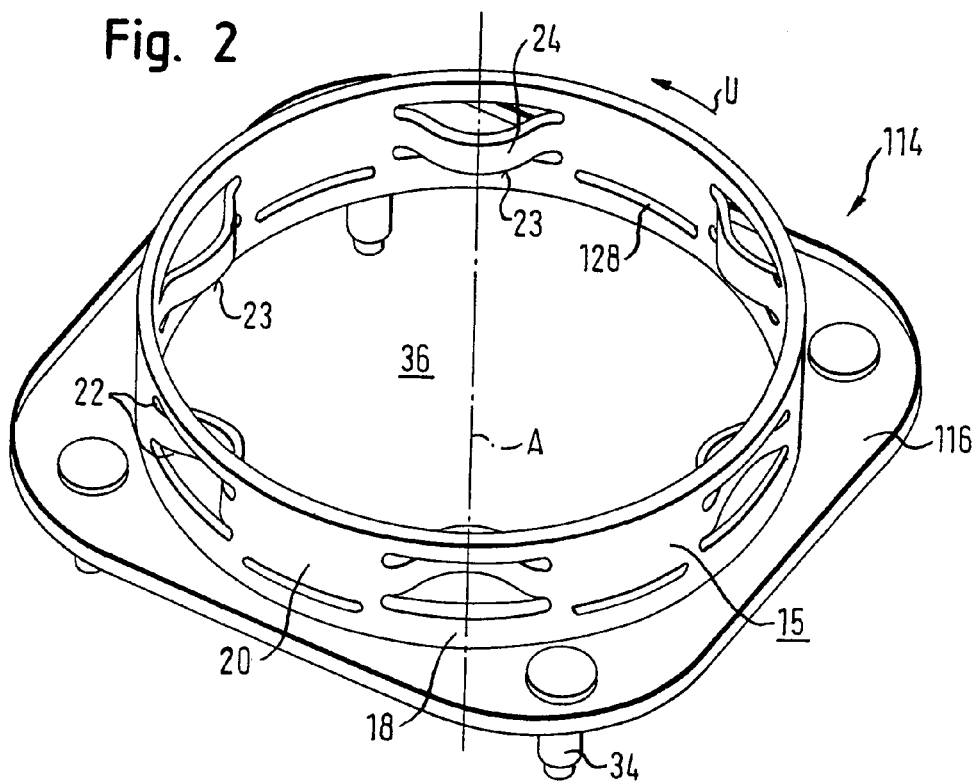
FIG. 2 shows a diagrammatic perspective view of a generator holder for an assembly in accordance with the invention according to a second embodiment.

In FIG. 2, a generator holder 114 is shown in accordance with a second embodiment. In contrast to the generator holder 14 of the first embodiment, the peripheral wall 15 is constructed as a circular cylindrical ring, which surrounds a central opening. First wall sections 18 with clamping extensions 24 also alternate here with second wall sections 20 without clamping extensions 24. In this case, six clamping extensions 24 are provided. Extending outwards from the wall sections is a substantially flat base plate 116, which gives the generator holder 114 a substantially square external periphery.

In this embodiment, the gas generator 12 is not placed on a ring-shaped flange 28, but rather on projections 128 formed on the second wall sections 20.

The putting together of the assembly takes place as described above.

The generator holder 114 is constructed, at the same time, as a gas bag holding element. The bolts 34 are fastened to the base plate 116.

The invention claimed is:

1. An assembly comprising:
   a gas generator (12) with a flange (30) and
   a generator holder (14; 114), to which said flange (30) is fastened,
   said generator holder (14; 114) having a cylindrical peripheral wall (15), said peripheral wall (15) at least partially surrounding said gas generator (12) peripherally,
   at least one clamping extension (24) being provided in said peripheral wall (15) which is formed by partial lateral deformation of said peripheral wall (15),
   characterized in that said clamping extension (24) is delimited by at least one slit (22) in said peripheral wall (15),
   said slit (22) running substantially in peripheral direction (U) and defining a side of said clamping extension (24),
   said side of said clamping extension (24) constituting a stop for said flange (30), wherein each clamping extension (24) is delimited by two slits (22) running substantially parallel to each other and extending in said peripheral direction (U).

2. The assembly according to claim 1, wherein said peripheral wall (15) is composed in peripheral direction (U) of alternating first wall sections (18) with clamping extensions (24) and second wall sections (20) without clamping extensions (24).

3. The assembly according to claim 2, wherein said first wall sections (18) have bridges (26) which are separate from said clamping extensions (24), each bridge (26) connecting two adjacent second wall sections (20).

4. The assembly according to claim 1, wherein said flange (30) completely surrounds said gas generator (12) peripherally.

5. The assembly according to claim 4, wherein on said generator holder (14) a flange (28) is provided, said flange (28) surrounding said generator holder (14) peripherically, said flange (30) of said gas generator (12) resting in peripheral direction continuously on said flange (28) of said generator holder (14).

6. The assembly according to claim 1, wherein said generator holder (14) has a radial flange (28) on which said flange (30) of said gas generator (12) rests in an installed state of said assembly (10).

7. An assembly comprising:
   a gas generator (12) with a flange (30) and a generator holder (14; 114), to which said flange (30) is fastened,
   said generator holder (14; 114) having a cylindrical peripheral wall (15), said peripheral wall (15) at least partially surrounding said gas generator (12) peripherally, at least one clamping extension (24) being provided in said peripheral wall (15) which is formed by partial lateral deformation of said peripheral wall (15), characterized in that said clamping extension (24) is delimited by at least one slit (22) in said peripheral wall (15), said slit (22) running substantially in peripheral direction (U) and defining a side of said clamping extension (24), said side of said clamping extension (24) constituting a stop for said flange (30), wherein said peripheral wall (15) is composed in peripheral direction (U) of alternating first wall sections (18) with clamping extensions (24) and second wall sections (20) without clamping extensions (24), wherein said clamping extensions (24) are strip-shaped sections of said peripheral wall (15) having opposite narrow sides (32) which continue in one piece into second wall sections (20).

8. The assembly according to claim 7, wherein said strip-shaped sections extend parallel to a central axis (A) of said generator holder (14; 114).

* * * * *